No. 630,710. Patented Aug. 8, 1899.
R. W. JAMIESON.
ANGLE GEARING.
(Application filed Dec. 17, 1898.)
(No Model.)
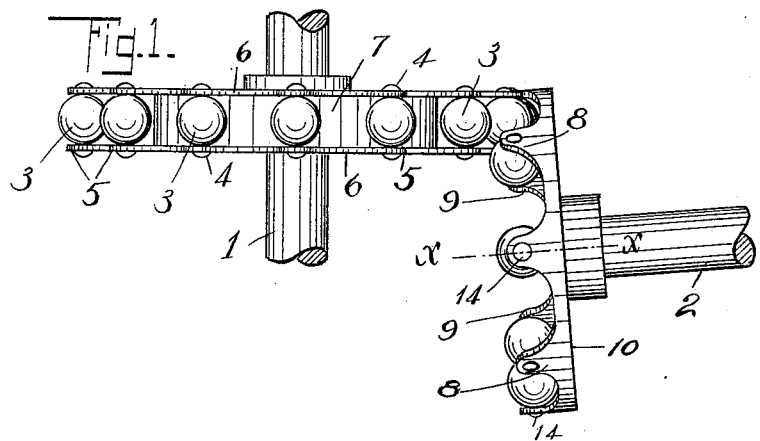
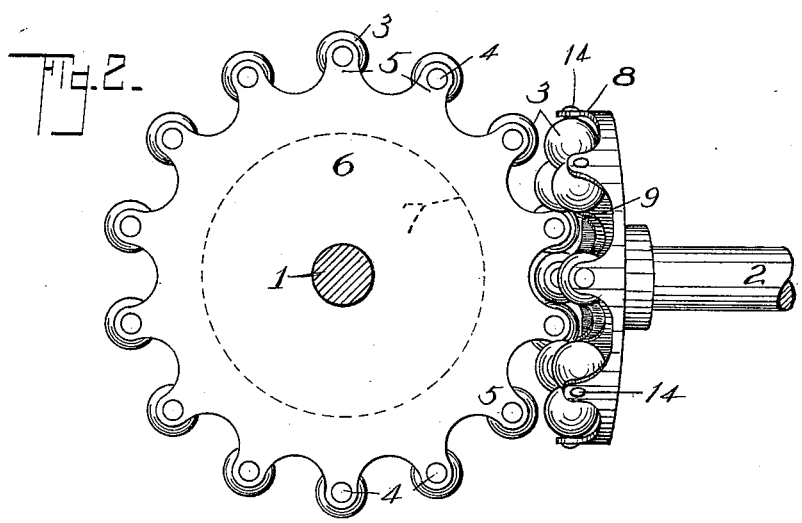
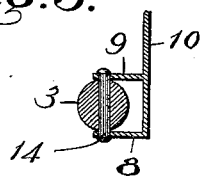
Witnesses.
G. Willard Rich.
Gracia Roda
Inventor.
Robert W. Jamieson
by Church & Church
his Attorneys

UNITED STATES PATENT OFFICE.

ROBERT WATSON JAMIESON, OF ROCHESTER, NEW YORK, ASSIGNOR TO THE JAMIESON MANUFACTURING COMPANY, OF SAME PLACE.

ANGLE-GEARING.

SPECIFICATION forming part of Letters Patent No. 630,710, dated August 8, 1899.

Application filed December 17, 1898. Serial No. 699,581. (No model.)

*To all whom it may concern:*

Be it known that I, ROBERT WATSON JAMIESON, of Rochester, in the county of Monroe and State of New York, have invented certain new and useful Improvements in Angle-Gearing; and I do hereby declare the following to be a full, clear, and exact description of the same, reference being had to the accompanying drawings, forming a part of this specification, and to the reference-numerals marked thereon.

My present invention has for its object to provide gearing particularly adapted for the so-called "chainless" bicycles which will work with uniform speed and reduce the friction between the teeth of the gearing to a minimum and at the same time permit a wide degree of deflection of the shafts without materially affecting its running qualities; and to these ends it consists in certain improvements hereinafter fully described, the novel features being pointed out particularly in the claims at the end of this specification.

In the accompanying drawings, Figure 1 is a plan view of gears constructed in accordance with my invention; Fig. 2, a side elevation of the same, and Fig. 3 a sectional view taken on the line *x x* of Fig. 1.

Similar reference-numerals in the several figures indicate similar parts.

The gearing consists generally of two wheels attached to shafts or axles 1 and 2, which may be the crank-axle and the rearwardly-extending transmitting-shaft, respectively, of a bicycle, said gears each having roller-teeth 3, having spherical outlines and pivoted to turn freely upon the pins or axes 4 and 14. The axes of the teeth of one of the gears—in the present construction the driving-gear on the shaft 1—are arranged parallel with the axis of said shaft, and the axes 14 of the teeth on the gear on the shaft 2 extend radially of said shaft. The pins of the roller-teeth on the shaft 1 preferably pass through the ends of fingers or projections 5 on the plates 6, which plates are separated by a suitable filling-piece 7 and clamped or otherwise rigidly secured to the axle, and the teeth of the gear on the shaft 2 are arranged between fingers 8 and 9, extending from the face of the wheel 10, which may be formed of sheet or cast metal or otherwise.

The balls forming the teeth of the gears have smooth exteriors and are uniform in size and shape, so that in case of wear or damage the teeth can be easily replaced, and when in mesh the teeth not only will run smoothly, either shaft being used as the driver, but on account of their shape any backlash is eliminated.

It is quite important to the successful operation of my device that the axes of the teeth which are in contact should be in substantially parallel planes, although by reason of the shape of the teeth a slight variation can be made without materially affecting the operation.

I claim as my invention—

1. In angle-gearing, the combination with two gear-wheels with their axes arranged at an angle to each other, each wheel having spherical or ball-like teeth, said teeth being revoluble upon their axes, and the axis of each tooth on each gear substantially parallel with the axis of the corresponding tooth of the opposite wheel when the two are in working contact.

2. In angle-gearing, a pair of gears having intermeshing spherical teeth, each tooth rolling on an axis, and the axes of intermeshing teeth extending in substantially parallel planes when said teeth are in working contact.

3. In angle-gearing, the combination with the shaft, of a gear thereon having spherical teeth, each rotatable on an axis parallel with that of the shaft, of a second shaft extending at an angle to the first shaft, and a gear thereon having spherical gear-teeth rotatable on axes extending substantially radially of the shaft.

ROBERT WATSON JAMIESON.

Witnesses:
F. F. CHURCH,
G. WILLARD RICH.